(12) United States Patent
Okayama et al.

(10) Patent No.: US 7,236,304 B2
(45) Date of Patent: Jun. 26, 2007

(54) IMAGING DEVICE

(75) Inventors: Hiroaki Okayama, Osaka (JP);
Michihiro Yamagata, Osaka (JP);
Kazutake Boku, Osaka (JP); Yasuhiro Tanaka, Hyogo (JP); Kenichi Hayashi, Nara (JP); Yoshimasa Fushimi, Osaka (JP); Shigeki Murata, Nara (JP);
Takayuki Hayashi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/578,226

(22) PCT Filed: Nov. 4, 2004

(86) PCT No.: PCT/JP2004/016332

§ 371 (c)(1),
(2), (4) Date: May 4, 2006

(87) PCT Pub. No.: WO2005/043893

PCT Pub. Date: May 12, 2005

(65) Prior Publication Data

US 2007/0091197 A1    Apr. 26, 2007

(30) Foreign Application Priority Data

Nov. 4, 2003  (JP) ............................ 2003-374724
Jun. 30, 2004  (JP) ............................ 2004-194195

(51) Int. Cl.
*G02B 27/10*  (2006.01)
*G02B 13/16*  (2006.01)
*H04N 5/225*  (2006.01)
*H04N 5/222*  (2006.01)

(52) U.S. Cl. ...................... 359/626; 359/619; 348/340; 348/335; 348/333.08

(58) Field of Classification Search ................ 348/294, 348/309, 333.08, 335, 340; 359/619, 626
See application file for complete search history.

(56) References Cited

U.S. PATENT DOCUMENTS

| | | | | |
|---|---|---|---|---|
| 3,743,772 A | * | 7/1973 | Pieters et al. | ................ 348/251 |
| 4,979,042 A | * | 12/1990 | Vogel | ........................ 348/251 |
| 5,157,497 A | * | 10/1992 | Topper et al. | .............. 348/615 |
| 6,707,955 B1 | | 3/2004 | Shiomi | |
| 6,963,674 B2 | * | 11/2005 | Shiomi | ........................ 382/312 |

FOREIGN PATENT DOCUMENTS

EP         1 079 613 A2    2/2001

(Continued)

*Primary Examiner*—David N. Spector
(74) *Attorney, Agent, or Firm*—McDermott Will & Emery LLP

(57) ABSTRACT

There is provided an imaging device which is small in light loss, is operable to suppress an occurrence of a stray light, and is operable to provide an image with a high quality as far as a periphery thereof. The imaging device operable to output an image of an object as an electrical image signal, comprising: a solid-state imaging sensor including pixels which are two dimensionally arranged on a first flat surface and each of which has a photo-electric conversion function; and a lens array including micro lenses two dimensionally arranged on a second flat surface separately provided so as to be parallel to the first flat surface, in which the solid-state imaging sensor includes an imaging area of unit including a plurality of pixels, and each of the micro lenses forms an optical image of the object on a corresponding imaging area of unit and satisfies a predetermined condition, arctan(L/f) $\leq \theta$, for a pixel, from among pixels included in an imaging area of unit corresponding to each micro lens, positioned farthest from an optical axis of a corresponding micro lens. Here, $\theta$ is a maximum angle of an incident light capable of entering a pixel, f is a focal length of a micro lens, and L is a diameter of a circle circumscribing an imaging area of unit corresponding to one of the micro lenses.

9 Claims, 15 Drawing Sheets

FOREIGN PATENT DOCUMENTS

| | | |
|---|---|---|
| JP | 59-50042 B2 | 12/1984 |
| JP | 04-322551 | 11/1992 |
| JP | 06-140612 | 5/1994 |
| JP | 06-197266 | 7/1994 |
| JP | 2000-324518 | 11/2000 |
| JP | 2000-349268 | 12/2000 |
| JP | 2001-16509 | 1/2001 |
| JP | 2001-61109 | 3/2001 |
| JP | 2003-143459 | 5/2003 |

* cited by examiner

F I G. 7
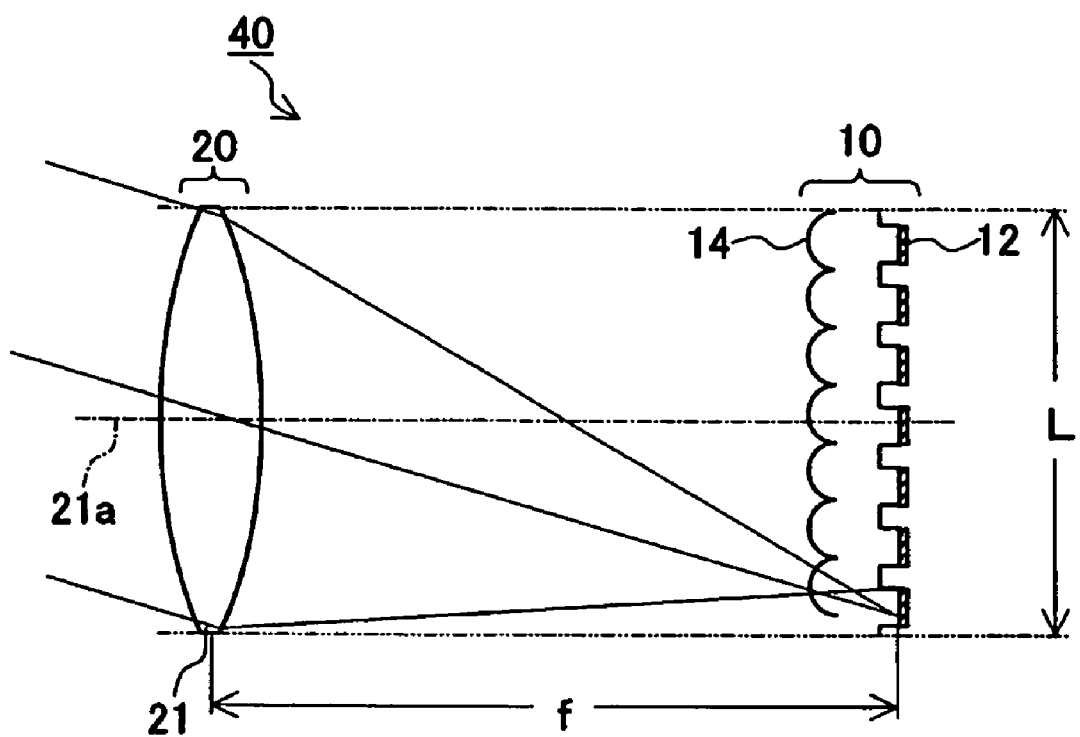

IMAGING DEVICE

This application is the U.S. National Phase under 35 U.S.C. § 371 of International Application No. PCT/JP2004/016332, filed Nov. 4, 2004, which in turn claims the benefit of Japanese Application No. 2003-374724, filed Nov. 4, 2003 and Japanese Application No. 2004-194195, filed Jun. 30, 2004, the disclosures of which Applications are incorporated by reference herein in their entirety.

TECHNICAL FIELD

The present invention relates to an imaging device. Particularly, the present invention relates to an imaging device having a micro lens array including a plurality of micro lenses arranged on an object side of a solid-state imaging sensor including a large number of pixels.

BACKGROUND ART

There have been increasing needs for a compact, thin type camera with excellent portability in a digital still camera market recently expanding. Circuitry parts for a signal process such as an LSI are becoming ever functionally sophisticated and downsized by means of minute wiring patterns. Also, storage media having a large capacity and in compact sizes are beginning to be available at low prices. However, imaging systems having lenses and solid-state imaging sensors such as a CCD or a CMOS are not yet sufficiently downsized, and there has been a demand for a development of a compact imaging system for realizing a camera with further portability.

In order to realize a downsized imaging system, a configuration exemplified by a lens array optical system having a plurality of micro lenses arranged on a flat surface is known. Conventional optical systems having a plurality of lenses arranged along an optical axis have problems that their volumes become large due to their lengths extending along the optical axis, and that aberrations thereof are large due to large lens diameters. On the other hand, a lens array optical system can be thin with respect to a direction of an optical axis, and aberrations thereof can be relatively reduced due to a small diameter of each micro lens.

Patent document 1 discloses an imaging system using such a lens array. The imaging system comprises, in order from an object side: a micro lens array having a plurality of micro lenses arranged on a flat surface; a pinhole mask formed of a plurality of pinholes, on a flat surface, having one on one correspondence with the micro lenses; and an image flat surface for a light having passed through each of the pinholes to form an image. Each micro lens forms a size-reduced image of an object on the pinhole mask, and each pinhole passes (sampling) a light of the size-reduced image which is different from pinhole to pinhole. Accordingly, an optical image of the object is formed on the image flat surface.

However, according to the imaging system of patent document 1, resolution of an optical image of an object formed on an image flat surface is determined by the number and density of micro lenses (namely, pinholes), and therefore, obtaining a high quality image has been difficult. In other words, because an arrangement of constituents each consisted of a micro lens and a pinhole pair determines a position of a sampling point for an image to be obtained, in order to obtain a high quality image, the number of the constituents needs to be increased so as to increase the number of sampling points, and a micro lens needs to be downsized so as to reduce pitch in arranging the constituents. However, due to limitation in downsizing of a micro lens, achieving a high resolution has been difficult. Also, a luminous flux reaching an image flat surface is limited by pinholes thereby losing a large quantity of light, and thus a problem in terms of sensitivity has been caused.

For solving the above problem, an imaging system using another lens array is disclosed in patent document 2. The imaging system comprises, in order from an object side: a micro lens array having a plurality of micro lenses arranged on a flat surface; a baffle layer including grid shape baffles for separating optical signals from the micro lens array such that the optical signals do not interfere each other; and a large number of photo-electric conversion elements arranged on a flat surface. An imaging unit comprises a micro lens, a space corresponding to the micro lens and separated by the baffle layer, and a plurality of photo-electric conversion elements corresponding to the micro lens.

In each imaging unit, a micro lens forms an optical image of an object on a corresponding plurality of photo-electric conversion elements. Accordingly, a shot image is obtained in each imaging unit. Resolution of the shot image corresponds to the number of photo-electric conversion elements (the number of pixels) configuring one imaging unit. Because relative positions of micro lenses with respect to the object differ from each other, a position of the object's optical image formed on the plurality of photo-electric conversion elements is different from imaging unit to imaging unit. As a result, an obtained shot image differs from imaging unit to imaging unit. Through signal processing a plurality of shot images different from each other, an image can be obtained. With this imaging system, a quality of a shot image obtained from an imaging unit is low due to the small number of pixels included in each imaging unit. However, by signal processing using shot images slightly displaced with respect to each other each obtained from each of a plurality of imaging units so as to reconstruct an image, it is possible to obtain an image with a quality similar to that obtained when shooting with a large number of photo-electric conversion elements.

[patent document 1] Japanese Examined Patent Publication No. 59-50042
[patent document 2] Japanese Laid-Open Patent Publication No. 2001-61109

DISCLOSURE OF THE INVENTION

PROBLEMS TO BE SOLVED BY THE INVENTION

However, according to the imaging system of patent document 2, an angle of an incident luminous flux becomes large as a photo-electric conversion element, from among the plurality of photo-electric conversion elements included in an imaging unit, becomes farther (i.e., periphery) from an optical axis of a corresponding micro lens.

As a result, the luminous flux entering with a large angle of incidence is shaded by a structure around the photo-electric conversion element thereby causing light loss. Accordingly, in each imaging unit, an output signal intensity of a photo-electric conversion element becomes small as the photo-electric conversion element becomes closer to the periphery, and therefore, a quality of an image obtained by reconstructing a plurality of shot images obtained from a plurality of imaging units is reduced. Also, a luminous flux which did not enter the photo-electric conversion element can enter an unintended photo-electric conversion element due to internal reflection, thereby causing an image quality reduction.

An object of the present invention is to provide an imaging device which, in each imaging unit, is small in light loss, is operable to suppress an occurrence of a stray light, and is operable to provide an image with a high quality as far as a periphery thereof.

Also, another object of the present invention is to provide an imaging device in which a light from a micro lens can enter a photo-electric conversion element without shading, and thus enabling to provide a high quality image.

SOLUTION TO THE PROBLEMS

One of the above objects is achieved by the following imaging device. An imaging device operable to output an image of an object as an electrical image signal, comprising:

a solid-state imaging sensor including pixels which are two dimensionally arranged on a first flat surface and each of which has a photo-electric conversion function; and a lens array including micro lenses two dimensionally arranged on a second flat surface separately provided so as to be parallel to the first flat surface, wherein the solid-state imaging sensor includes imaging areas of unit including a plurality of the pixels, each of the micro lenses forms an optical image of the object on a corresponding imaging area of unit, and, a following expression (1) is satisfied for a pixel, from among the pixels included in the imaging area of unit corresponding to each of the micro lenses, positioned farthest from an optical axis of a corresponding micro lens:

$$\arctan(L/f) \leq \theta \qquad (1),$$

where $\theta$ is a maximum angle of an incident light capable of entering a pixel, f is a focal length of a micro lens, and L is a diameter of a circle circumscribing an imaging area of unit corresponding to one of the micro lenses.

Each pixel may have a pixel lens on a light incidence side thereof. In such a case, instead of the aforementioned expression (1), the following expression (2) is satisfied for the pixel, from among the pixels included in the imaging area of unit corresponding to each of the micro lenses, positioned farthest from the optical axis of the corresponding micro lens:

$$\arctan(L/f) \leq \arcsin NA \qquad (2),$$

where

NA is a numerical aperture of a pixel lens.

Also, each pixel may have a pixel lens on a light incidence side thereof, and at least one pixel lens may be positioned such that an optical axis thereof is displaced from a center of a photo-electric conversion portion of a corresponding pixel. In such a case, instead of the aforementioned expression (1), the following expression (3) is satisfied for the pixel, from among the pixels included in the imaging area of unit corresponding to each of the micro lenses, positioned farthest from the optical axis of the corresponding micro lens:

$$\arctan(L/f) - \phi \leq \arcsin NA \qquad (3),$$

where

NA is a numerical aperture of a pixel lens, and $\phi$ is an angle formed between a normal line of the first flat surface and a straight line connecting an apex on a light incidence side of a pixel lens and a center of an imaging area of unit.

In a solid-state imaging sensor exemplified by a CCD, a CMOS, or the like, a photo-electric conversion portion (hereinafter, referred to as a "light receiving section") for performing a photo-electric conversion accounts for only a portion of the image sensor, and is not arranged on a surface of the image sensor. Therefore, generally, if an angle of an incident luminous flux is large, the luminous flux entering the image sensor is shaded and reflected by a structure around the light receiving section, thereby not being able to enter the light receiving section.

However, according to the imaging device of the present invention, the angle of the incident luminous flux entering the light receiving section is appropriately controlled, whereby the luminous flux is not shaded. Accordingly, light loss is reduced and an occurrence of a stray light is suppressed, whereby a high quality image can be obtained.

In the imaging device of the present invention, it is preferable that each output signal from a plurality of pixels corresponding to one micro lens be compensated by a compensation coefficient set in advance according to the distance between each of the pixels and an optical axis of the micro lens. Accordingly, it is possible to solve a problem that, in each imaging unit, an output signal intensity is reduced due to a reduction in quantity of light entering a light receiving section as the light receiving section of a pixel becomes farther from an optical axis of a corresponding micro lens. Consequently, an image with a high quality as far as a periphery thereof can be obtained.

Also, when at least one pixel lens is positioned such that an optical axis thereof is displaced from a center of a photo-electric conversion portion of a corresponding pixel, the pixel lens may be positioned such that the optical axis thereof is displaced in a direction toward the optical axis of the corresponding micro lens with respect to the center of the photo-electric conversion portion of the corresponding pixel.

According to the imaging device of the present invention, an angle of an incident luminous flux entering a light receiving section is appropriately set, thereby preventing the luminous flux from being shaded. Accordingly, light loss can be reduced and an occurrence of a stray light can be suppressed, whereby an image with a high quality as far as a periphery thereof can be obtained.

EFFECT OF THE INVENTION

According to the present invention, it is possible to provide an imaging device which, in each imaging unit, is small in light loss, is operable to suppress an occurrence of a stray light, and is operable to provide an image with a high quality as far as a periphery thereof.

Also, according to the present invention, it is possible to provide an imaging device in which, in each imaging unit, a light from a micro lens can enter a photo-electric conversion element without shading, and thus enabling to provide a high quality image.

BRIEF DESCRIPTION OF THE DRAWINGS

FIG. 7 is a cross sectional illustration of an imaging unit included in an imaging device according to Embodiment 3 of the present invention showing a section including an optical axis of a micro lens.

Figure 1:
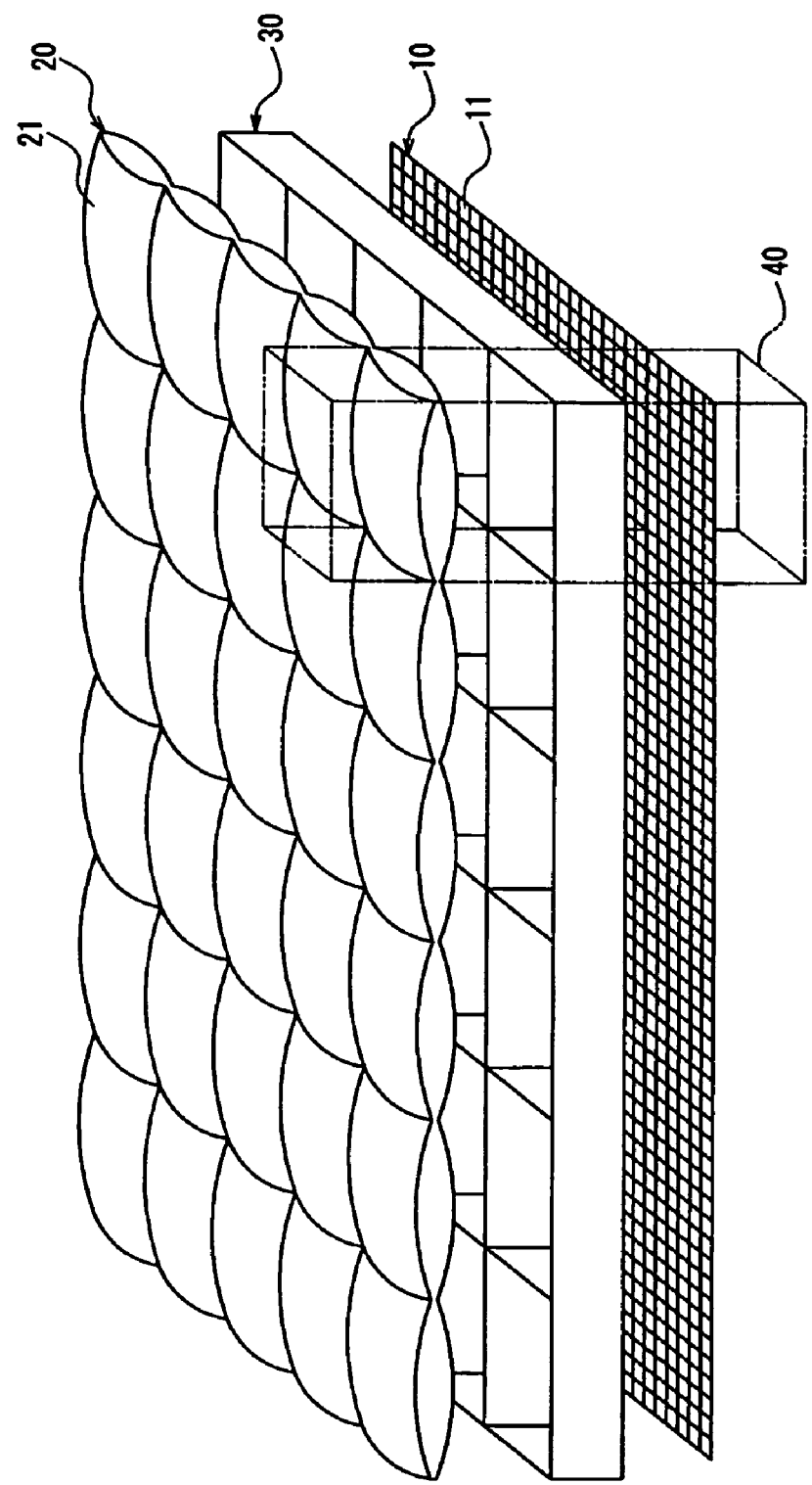
FIG. 1 is a diagrammatic perspective illustration showing a schematic configuration of an imaging device according to Embodiment 1 of the present invention.

DESCRIPTION OF THE REFERENCE CHARACTERS 10 solid-state imaging sensor
10a normal line of first flat surface
11 pixel
12 light receiving section (photo-electric conversion portion)
13,14 pixel lens
15 second pixel lens
20 micro lens array
21 micro lens
21a optical axis of micro lens
30 baffle layer
40 imaging unit
110 solid-state imaging sensor
110a normal line of first flat surface
111 pixel
112 light receiving section (photo-electric conversion portion)
112a center line of light receiving section
113 pixel lens
113a optical axis of pixel lens
120 micro lens array
121 micro lens
121a optical axis of micro lens
130 baffle layer
140 imaging unit

BEST MODE FOR CARRYING OUT THE INVENTION

Hereinafter, embodiments of the present invention are described with reference to the diagrams.

Embodiment 1

FIG. 1 is a diagrammatic perspective illustration showing a schematic configuration of an imaging device according to Embodiment 1 of the present invention. In FIG. 1, the imaging device comprises a solid-state imaging sensor 10 (e.g., CCD or CMOS) including a large number of pixels 11 two dimensionally arranged in lateral and longitudinal directions on a first flat surface, and a micro lens array 20 including a plurality of micro lenses 21 two dimensionally arranged in lateral and longitudinal directions on a second flat surface separately provided so as to be parallel to the first flat surface. The solid-state imaging sensor 10 includes an imaging area of unit including a plurality of the pixels 11, and each micro lens forms an optical image of an object on a corresponding imaging area of unit. In other words, a luminous flux from the object enters the plurality of micro lenses 21, and each of the micro lenses 21 forms an optical image of the object on a corresponding imaging area of unit.

Also, in order to prevent crosstalk from being caused by a light from the micro lens 21 entering the pixel 11 not corresponding to the micro lens 21, a baffle layer 30 is arranged in a grid manner so as to correspond to positions of the micro lenses 21. One imaging unit 40 comprises the micro lens 21, a space divided by the baffle layer 30, and the plurality of pixels 11 included in an imaging area of unit corresponding to the micro lens 21. Note that the baffle layer 30 can be omitted if a luminous flux from the micro lens 21 of another imaging unit 40 can be prevented from entering the pixel 11 to an extent that problems are not to be caused.

Figure 2:
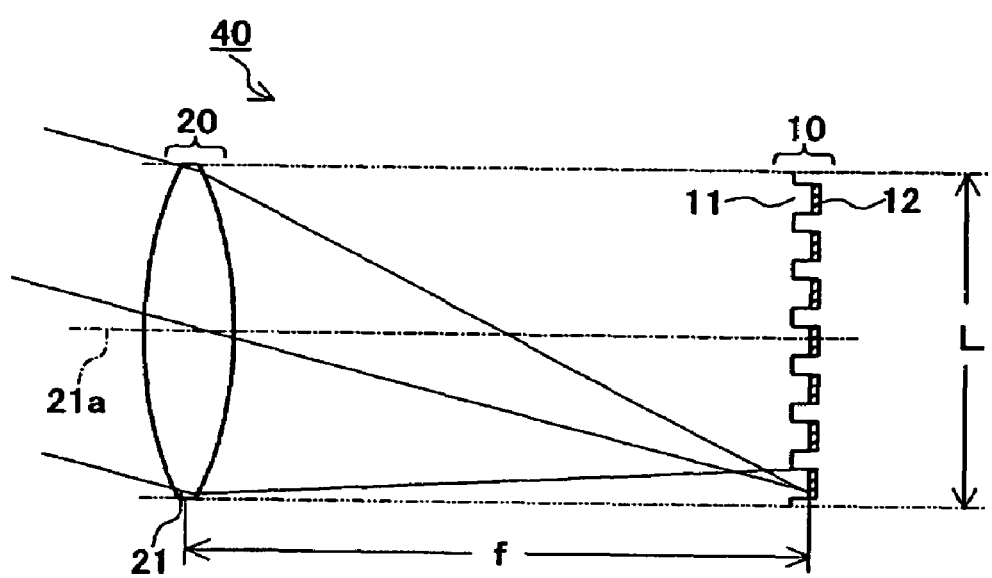
FIG. 2 is a cross sectional illustration of an imaging unit included in the imaging device according to Embodiment 1 of the present invention showing a section including an optical axis of a micro lens.

FIG. 2 is a cross sectional illustration of the imaging unit 40 of the imaging device according to the present embodiment showing a section including an optical axis 21a of the micro lens 21. The baffle layer 30 is not shown in FIG. 2. The pixels 11 are positioned so as to be axisymmetrical with respect to the optical axis 21a.

In the solid-state imaging sensor 10 exemplified by a CCD, a CMOS, or the like, a light receiving section (photo-electric conversion portion) 12 which is arranged on each of the pixels 11 for performing a photo-electric conversion is generally positioned not on a surface of the solid-state imaging sensor 10 but on a bottom part of a depressed portion thereof, as shown in FIG. 2. Accordingly, an angle of an incident light which can enter the light receiving section 12 has an upper limit. As FIG. 2 clearly illustrates, the angle of the incident light from the micro lens 21 becomes large as a position of the light receiving section 12 becomes farther from the optical axis 21a of the micro lens 21.

Figure 3:
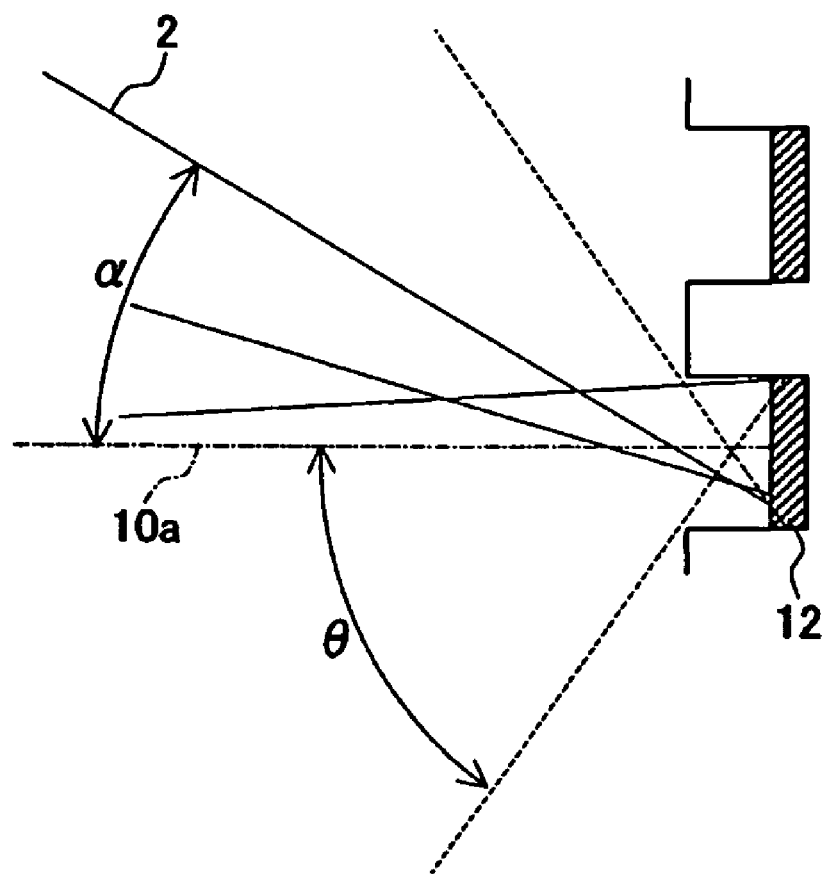
FIG. 3 is an enlarged cross sectional illustration showing a vicinity of a light receiving section of the imaging device according to Embodiment 1 of the present invention.

FIG. 3 is an enlarged cross sectional illustration showing a vicinity of the light receiving section 12. In FIG. 3, a normal line 10a is defined with respect to the first flat surface where the light receiving sections 12 are arranged. Also, a maximum angle of incidence $\theta$ is defined with respect to a light which can enter the light receiving section 12. An angle of incidence $\alpha$ is defined with respect to the light receiving section 12 on which a light 2 enters from the micro lens 21. In FIG. 3, in order for the light 2 from the micro lens 21 to enter the light receiving section 12 without shading, it is necessary to be $\alpha \leq \theta$.

As shown in FIG. 2, when a focal length of the micro lens 21 is f and a diameter of a circle circumscribing an area (i.e., an image projection area, within the solid-state imaging sensor 10, along the optical axis 21a of the imaging unit 40) where the plurality of pixels 11 corresponding to one micro lens 21 are positioned is L, an angle of an incident light is $\alpha = \arctan(L/f)$ at a pixel (light receiving section 12) farthest from the optical axis 21a.

Therefore, the imaging device needs to satisfy:

$$\arctan(L/f) \leq \theta \qquad (1).$$

When the above expression (1) is satisfied for the light receiving section 12 of the pixel 11 farthest from the optical axis 21a, a luminous flux from the micro lens 21 enters all of the corresponding light receiving sections 12 without being shaded by a structure of the solid-state imaging sensor 10. More accurately, when the above expression (1) is satisfied, a luminous flux entering the light receiving section 12 from the micro lens 21 enters the light receiving section 12 without loss if there is no aberration for the luminous flux from the micro lens 21, and, even if there is an aberration included therein, loss in the luminous flux can be minimized.

Note that, in the above description, the optical axis 21a passes through approximately a center of the circumscribed circle, and the diameter L of the circumscribed circle usually equals to a diameter of a circle circumscribing an effective portion of the micro lens 21. In addition, a shape of the imaging unit 40 viewed along the optical axis 21a is substantially square in the present embodiment, and therefore the diameter L equals to a length of a diagonal line of the square.

Figure 4:
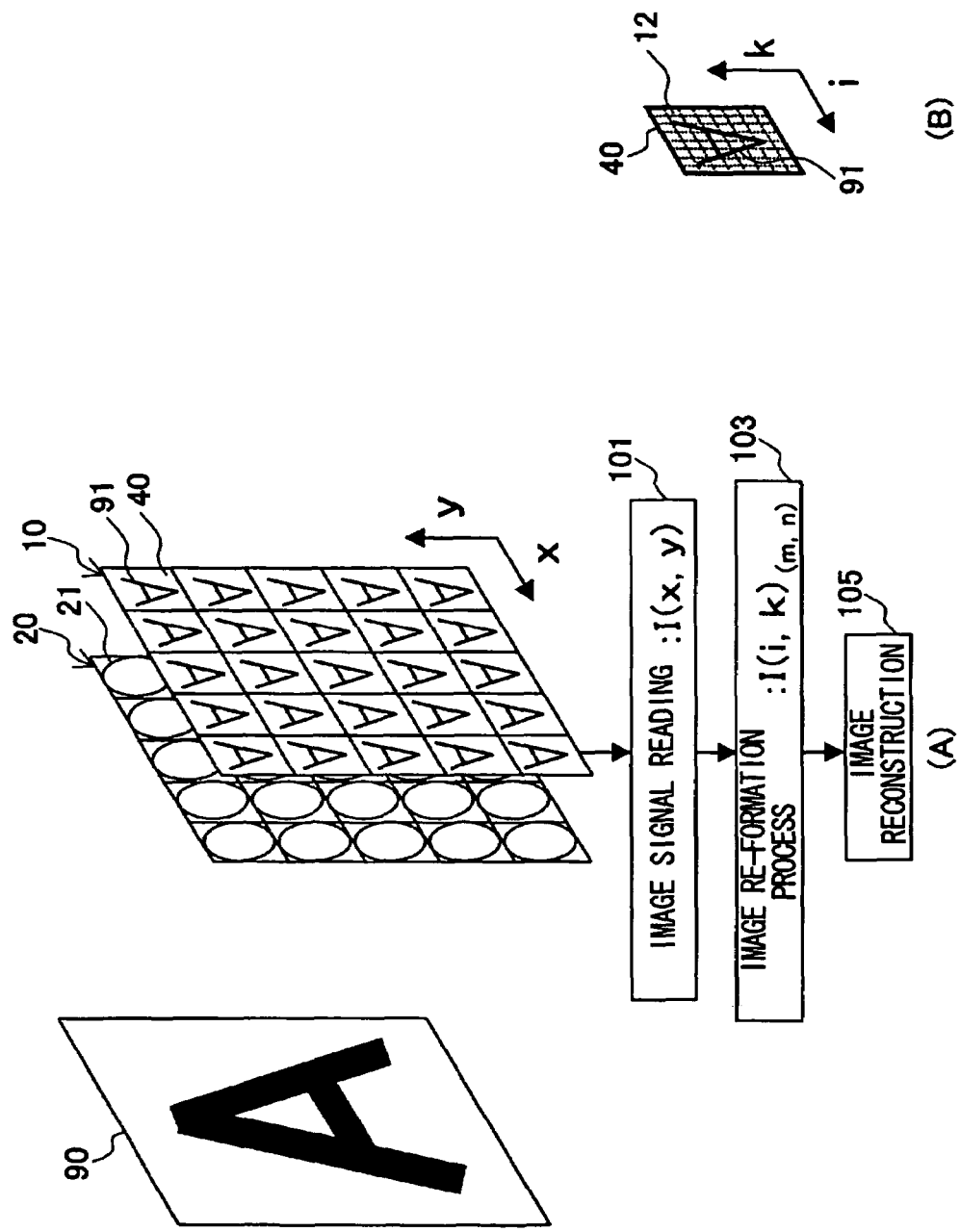
FIG. 4(A) is a diagram showing a process outline for a signal from a solid-state imaging sensor of the imaging device according to Embodiment 1 of the present invention.
FIG. 4(B) is a diagrammatic perspective illustration showing the light receiving section included in the imaging unit of the imaging device according to Embodiment 1 of the present invention.

Next, a method for obtaining an image from a luminous flux having entered the light receiving section 12 of the solid-state imaging sensor 10 is described with reference to FIGS. 4(A) and 4(B). As shown in FIG. 4(A), in each imaging unit 40, the micro lens 21 of the micro lens array 20 forms an image 91 of an object 90 on the solid-state imaging sensor 10. Each light receiving section 12 of the solid-state imaging sensor 10 photo-electric converts the entered luminous flux. Here, when a vertical axis of the solid-state imaging sensor 10 is an x axis, a horizontal axis thereof is an y axis, and a signal from the light receiving section 12 positioned at a point (x,y) is I(x,y), signals I(x,y) for all of the light receiving sections 12 included in the solid-state imaging sensor 10 are read (step 101).

Next, the signals I(x,y) from the light receiving sections 12 are divided with respect to each imaging unit 40. That is, as shown in FIG. 4(B), when a position of the light receiving section 12 at an i-th column and a k-th row in the imaging unit 40 where the light receiving sections 12 are arranged in m columns×n rows is $(i,k)_{(m,n)}$ and a signal from the light receiving section 12 is $I(i,k)_{(m,n)}$, the above signal I(x,y) is treated as the signal $I(i,k)_{(m,n)}$ in the imaging unit 40. Consequently, an image consisted of pixels arranged in m columns×n rows is re-formed with respect to each imaging unit 40 (step 103).

Thereafter, a piece of image is reconstructed by processing signals $I(i,k)_{(m,n)}$ among different imaging units 40 (step 105). As a signal process therefor, a method disclosed in patent document 2 can be used, and therefore, a detailed description therefor is omitted. The signal $I(i,k)_{(m,n)}$ from the light receiving section 12 arranged at a same position (i,k) differs from imaging unit 40 to imaging unit 40 because a position where the object's optical image 91 is formed in the imaging unit 40 differs from imaging unit 40 to imaging unit 40. Accordingly, an image with a high resolution which significantly exceeds the number (m×n) of the light receiving sections 12 included in one imaging unit 40 can be obtained.

According to the present embodiment, in each imaging unit 40, a luminous flux from the micro lens 21 enters all of the light receiving sections 12 without being shaded by a structure of the solid-state imaging sensor 10. Therefore, a sufficient quantity of light enters the light receiving section 12 regardless the position thereof, whereby a high contrast signal I(x,y) can be obtained. Accordingly, reconstruction of a detail structure of an object can be performed.

In the above signal process, if a signal intensity for a same position of the object 90 differs from imaging unit 40 to imaging unit 40, an image quality degradation such as a reduction in contrast or in resolution for an image to be reconstructed is caused. With the imaging device of the present embodiment satisfying the above expression (1), a luminous flux enters all of the light receiving sections 12 included in each imaging unit 40 without shading, whereby it is possible to reduce intensity differences in signals for the same position of the object 90 between imaging units 40. Accordingly, a high quality image can be obtained.

Moreover, a luminous flux can be prevented from being shaded, thereby reducing the amount of reflected luminous flux entering an unintended light receiving section 12. Therefore, an image quality degradation due to a stray light can be prevented.

Embodiment 2

Figure 5:
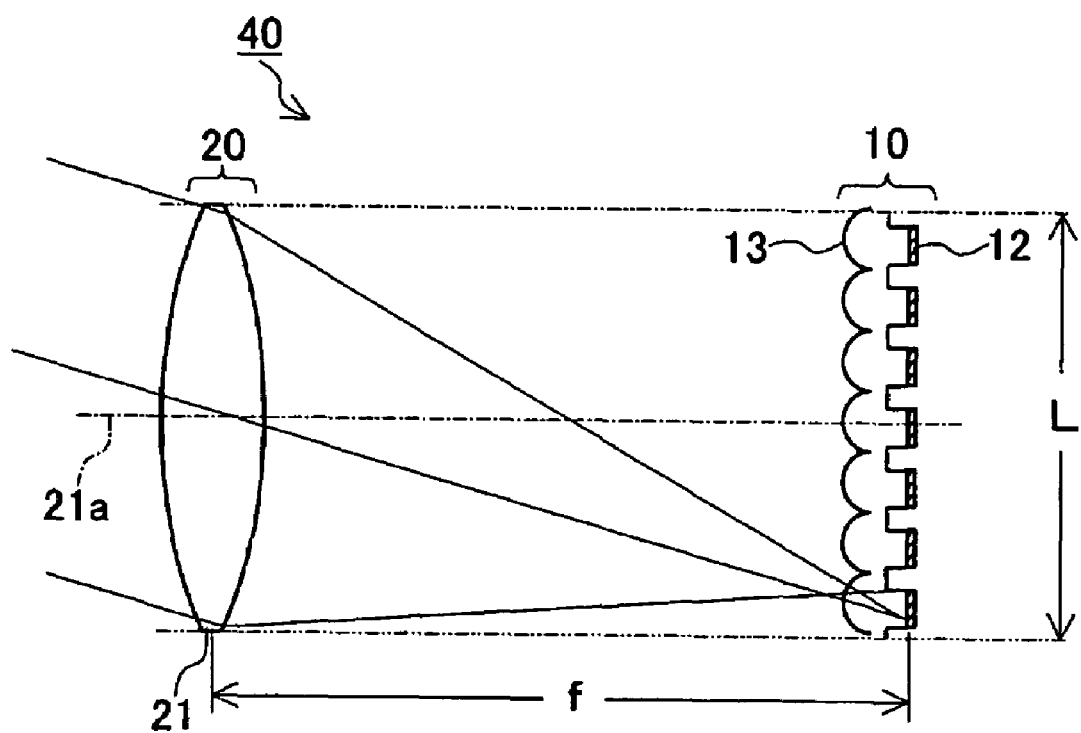
FIG. 5 is a cross sectional illustration of an imaging unit included in an imaging device according to Embodiment 2 of the present invention showing a section including an optical axis of a micro lens.

An imaging device according to Embodiment 2 of the present invention is described focusing on differences from Embodiment 1. FIG. 5 is a cross sectional illustration of the imaging unit 40 of the imaging device according to the present embodiment showing a section including the optical axis 21a of the micro lens 21. The present embodiment differs from Embodiment 1 in that a pixel lens 13 is provided on a light incidence side of the light receiving section 12 of the solid-state imaging sensor 10 so as to have one on one correspondence between the light receiving section 12 and the pixel lens 13. Elements having a function similar to that in Embodiment 1 are attached with same reference numerals as in Embodiment 1, and a description therefor is omitted.

The pixel lens 13 is also referred to as an "on chip lens", and leads a luminous flux which is to form an image on a place other than the light receiving section 12 to the light receiving section 12. Pitch in arranging pixel lenses 13 is equal to pitch in arranging the light receiving sections 12, and an optical axis of the pixel lens 13 passes through approximately a center of a corresponding light receiving section 12. When viewed, along the optical axis 21*a*, a surface of the solid-state imaging sensor 10, an area accounted for the light receiving section 12 is only a portion of the solid-state imaging sensor 10. Therefore, with the solid-state imaging sensor 10 of Embodiment 1 having no pixel lens 13, a portion of a luminous flux from the micro lens 21 enters the light receiving section 12, and the rest thereof is reflected without entering the light receiving section 12, thereby leading to loss in quantity of light. When the pixel lens 13 having an effective diameter larger than the light receiving section 12 is provided on the light incidence side of the light receiving section 12 as in the present embodiment, an efficiency in collecting light can be improved, loss in quantity of light can be reduced, and receiving sensitivity can be enhanced. Also, a stray light which occurs due to reflection from a part other than the light receiving section 12 is reduced in amount, whereby an image quality degradation due thereto can be reduced.

Figure 6:
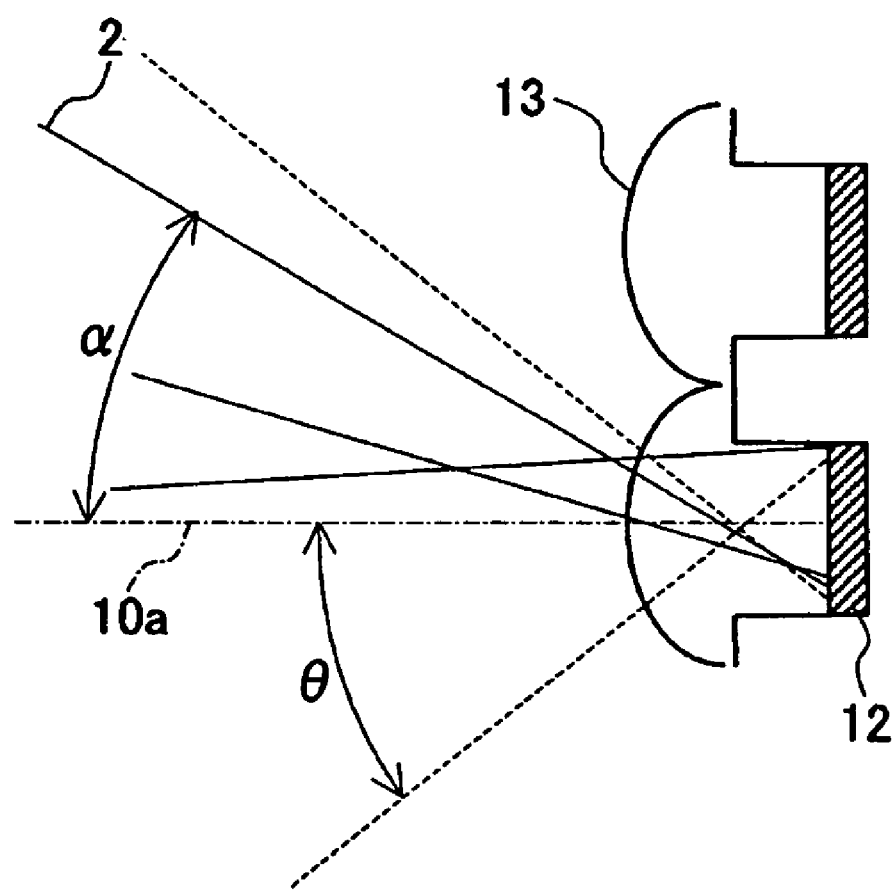
FIG. 6 is an enlarged cross sectional illustration showing a vicinity of a light receiving section of the imaging device according to Embodiment 2 of the present invention.

FIG. 6 is an enlarged cross sectional illustration showing a vicinity of the light receiving section 12. Even in a case where the pixel lens 13 is provided, there exists a maximum angle of incidence θ for a light which can enter the light receiving section 12, as in the case with Embodiment 1. α is an angle of incidence for the light 2 from the micro lens 21 with respect to the light receiving section 12. In order for the light 2 from the micro lens 21 to enter the light receiving section 12 without shading, it is necessary to be α≦θ.

Here, when a numerical aperture of the pixel lens 13 is NA, the maximum angle of incidence θ depends on the NA, and substantially, θ=arcsin NA is followed. Also, as shown in FIG. 5, when a focal length of the micro lens 21 is f and a diameter of a circle circumscribing a plurality of imaging areas of unit (i.e., an image projection area, within the solid-state imaging sensor 10, along the optical axis 21*a* of the imaging unit 40) corresponding to one micro lens 21 is L, an angle of incidence is α=arctan(L/f) at a pixel (light receiving section 12) farthest from the optical axis 21*a*.

Therefore, the imaging device needs to satisfy:

$$\arctan(L/f) \leqq \arcsin NA \quad (2).$$

When the above expression (2) is satisfied for the light receiving section 12 of the pixel 11 farthest from the optical axis 21*a*, a luminous flux from the micro lens 21 enters all of the corresponding light receiving sections 12 without being shaded by a structure of the solid-state imaging sensor 10, as in Embodiment 1.

Because the pixel lens 13 is often an imperfect spherical lens due to its manufacturing process, the above relationship θ=arcsin NA might not be obtained. Even so, however, loss in quantity of light can be reduced by satisfying the above expression (2).

The method for obtaining an image based on an output signal from the solid-state imaging sensor 10 is same as that in Embodiment 1. According to the present embodiment, a high quality image can be obtained as in the case of Embodiment 1.

Embodiment 3

An imaging device according to Embodiment 3 of the present invention is described focusing on differences from Embodiments 1 and 2. FIG. 7 is a cross sectional illustration of the imaging unit 40 of the imaging device according to the present embodiment showing a section including the optical axis 21*a* of the micro lens 21. In the present embodiment, a pixel lens 14 is provided on the light incidence side of the light receiving section 12 of the solid-state imaging sensor 10 so as to have one on one correspondence between the light receiving section 12 and the pixel lens 14, as in Embodiment 2. However, the present embodiment differs from Embodiment 2 in that at least one of pixel lenses 14 is positioned such that an optical axis thereof is displaced from the center of the corresponding light receiving section 12, whereas optical axes of all the pixel lenses 13 pass through centers of the corresponding light receiving sections 12 in Embodiment 2. It is not necessary that the amount of displacement for the optical axis of the pixel lens 14 with respect to the center of the light receiving section 12 is same for all pixel lenses 14 included in the solid-state imaging sensor 10. For example, the amount of displacement for the optical axis of the pixel lens 14 with respect to the center of the light receiving section 12 may be nearly zero when the light receiving section is at the center of a light reception area of the solid-state imaging sensor 10, and may be gradually increased as the light receiving section becomes closer to a periphery thereof. Elements having a function similar to that in Embodiments 1 and 2 are attached with same reference numerals as in the embodiments, and a description therefor is omitted.

The pixel lens 14 can improve an efficiency in collecting light, reduce loss in quantity of light, and enhance receiving sensitivity, as with the pixel lens 13 in Embodiment 2. Also, a stray light due to reflection from a part other than the light receiving section 12 can be reduced in amount, whereby an image quality degradation due thereto can be reduced.

Figure 8:
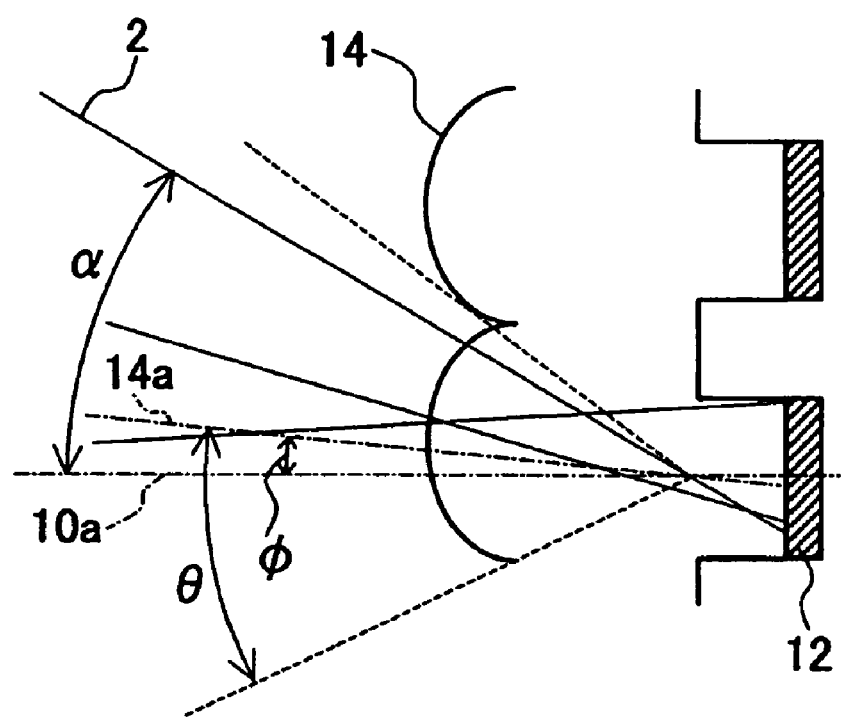
FIG. 8 is an enlarged cross sectional illustration showing a vicinity of a light receiving section of the imaging device according to Embodiment 3 of the present invention.

FIG. 8 is an enlarged cross sectional illustration showing a vicinity of the light receiving section 12. In the present embodiment, the pixel lens 14 is displaced with respect to the light receiving section 12, and therefore, as long as a light has an angle equal to or less than an angle θ with respect to a straight line 14*a* connecting an apex on a light incidence side of the pixel lens 14 and a center of the light receiving section 12 corresponding to the pixel lens 14, the light can enter the light receiving section 12. α is an angle of incidence for the light 2 from the micro lens 21 with respect to the light receiving section 12. φ is an angle formed between the straight line 14*a* and the normal line 10*a* of the first flat surface where the light receiving sections 12 are arranged. In order for the light 2 from the micro lens 21 to enter the light receiving section 12 without shading, it is necessary to be α−φ≦θ.

As described in Embodiment 2, when a numerical aperture of the pixel lens 14 is NA, the angle θ depends on the NA, and substantially, θ=arcsin NA is followed. Also, as shown in FIG. 7, when a focal length of the micro lens 21 is f and a diameter of a circle circumscribing an imaging area of unit (i.e., an image projection area, within the solid-state imaging sensor 10, along the optical axis 21*a* of the imaging unit 40) corresponding to one micro lens 21 is L, an angle of incidence is α=arctan(L/f) at a pixel (light receiving section 12) farthest from the optical axis 21*a*.

Therefore, it is necessary to satisfy:

$$\arctan(L/f) - \phi \leqq \arcsin NA \quad (3).$$

When the above expression (3) is satisfied for the light receiving section 12 of the pixel 11 farthest from the optical axis 21*a*, a luminous flux from the micro lens 21 enters all of the corresponding light receiving sections 12 without being shaded by a structure of the solid-state imaging sensor 10.

Because the pixel lens 14 is often an imperfect spherical lens due to its manufacturing process, the above relationship θ=arcsin NA might not be obtained. Even so, however, loss in quantity of light can be reduced by satisfying the above expression (3).

The method for obtaining an image based on an output signal from the solid-state imaging sensor 10 is same as that in Embodiment 1. According to the present embodiment, a high quality image can be obtained as in the case of Embodiments 1 and 2.

Embodiment 4

Figure 9:
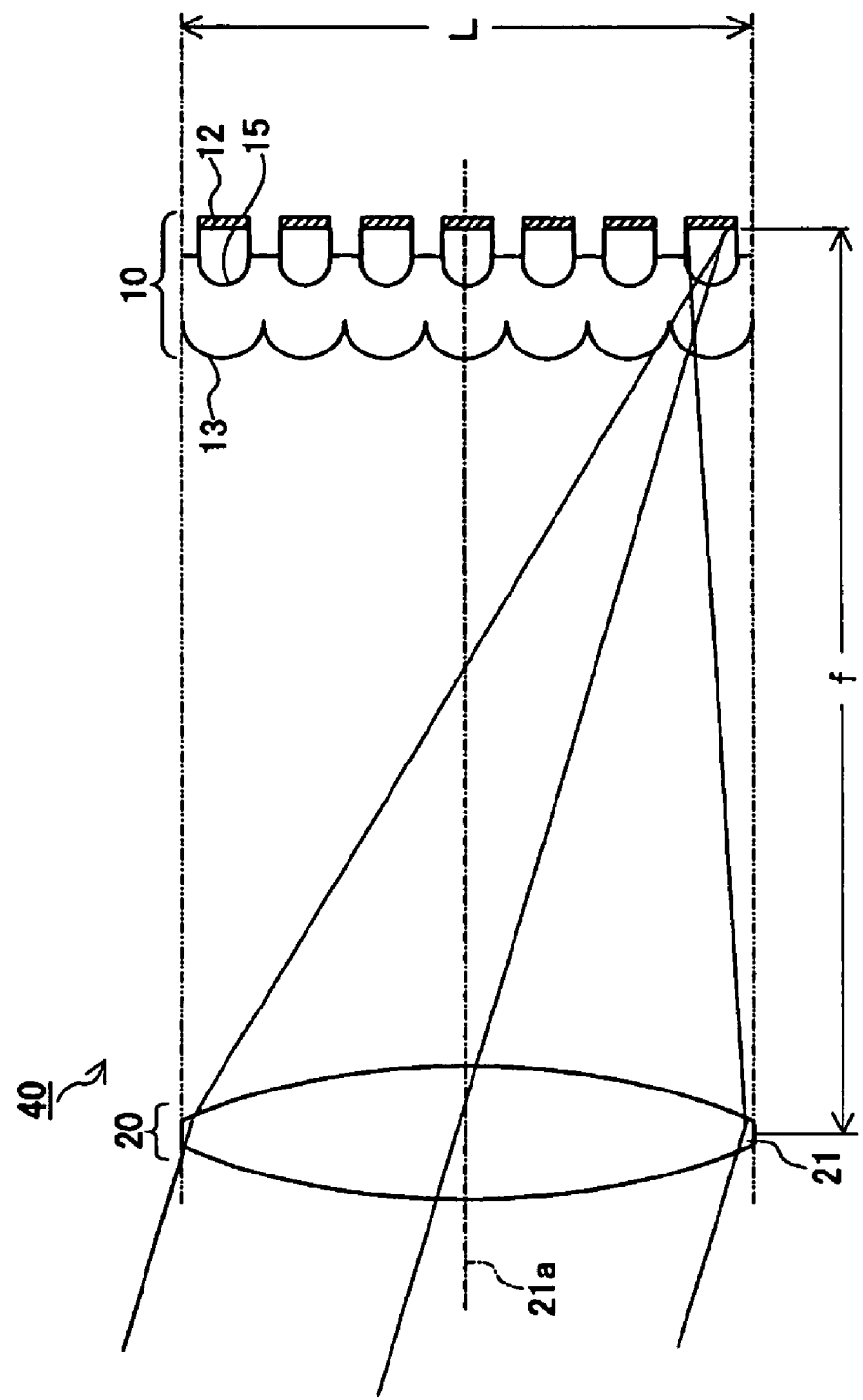
FIG. 9 is a cross sectional illustration of an imaging unit included in an imaging device according to Embodiment 4 of the present invention showing a section including an optical axis of a micro lens.

An imaging device according to Embodiment 4 of the present invention is described focusing on differences from Embodiments 1 to 3. FIG. 9 is a cross sectional illustration of the imaging unit 40 of the imaging device according to the present embodiment showing a section including the optical axis 21a of the micro lens 21. In the present embodiment, the pixel lens (first pixel lens) 13 is provided on the light incidence side of the light receiving section 12 of the solid-state imaging sensor 10 so as to have one on one correspondence between the light receiving section 12 and the pixel lens 13, as in Embodiment 2. However, the present embodiment differs from Embodiment 2 in that a second pixel lens (intralayer lens) 15 is further provided between the pixel lens 13 and the light receiving section 12. An optical axis of the first pixel lens 13 matches with an optical axis of the second pixel lens 15. Elements having a function similar to that in Embodiments 1 to 3 are attached with same reference numerals as in the embodiments, and a description therefor is omitted.

The second pixel lens 15 can improve an efficiency in collecting light, reduce loss in quantity of light, and enhance receiving sensitivity, as with the first pixel lens 13. Therefore, according to the present embodiment having the second pixel lens 15 in addition to the pixel lens 13, a maximum angle of incidence θ for a light which can enter the light receiving section 12 is increased as compared to that in Embodiment 2 having no second pixel lens 15.

Even in this case, when a numerical aperture of an optical system having the first pixel lens 13 and the second pixel lens 15 is NA, it is preferable that the expression (2) described in Embodiment 2 for the light receiving section 12 of the pixel 11 farthest from the optical axis 21a in the imaging unit 40 be satisfied. Accordingly, a high quality image can be similarly obtained as described in Embodiment 2.

Note that, although a case that the second pixel lens 15 is added to an optical system of FIG. 5 described in Embodiment 2 is described with reference to FIG. 9, the second pixel lens 15 can be similarly added to an optical system of FIG. 7 described in Embodiment 3. In such a case, an optical axis of the second pixel lens 15 should be substantially matched with an optical axis of the pixel lens 14. Even in this case, when a numerical aperture of the optical system having the pixel lens 14 and the second pixel lens 15 is NA, the expression (3) described in Embodiment 3 is preferably satisfied for the light receiving section 12 of the pixel 11 farthest from the optical axis 21a in the imaging unit 40. Accordingly, a high quality image can be similarly obtained as described in Embodiment 3.

Embodiment 5

The expressions (1) to (3) described in Embodiments 1 to 4 are for enhancing an image quality by reducing intensity differences of signals for a same position of the object 90 between imaging units 40. The present embodiment describes a method for enhancing an image quality by reducing signal intensity differences due to an arrangement of the light receiving sections 12 in one imaging unit 40.

When an object is a plain flat surface of uniform brightness, generally, quantity of a luminous flux which enters the light receiving sections 12 included in one imaging unit 40 becomes large as a light receiving section becomes closer to the optical axis 21a of the micro lens 21, and becomes small as a light receiving section becomes farther from the optical axis. Accordingly, an intensity of a signal $I(i, k)_{(m,n)}$ from the light receiving section 12 arranged at a position $(i,k)_{(m,n)}$ shown in FIG. 4(B) becomes large as the signal comes from a light receiving section in the vicinity of the optical axis 21a of the micro lens 21, and becomes small as the signal comes from a light receiving section farther from the optical axis. As such, the signal intensity is small at a periphery of a screen thereby leading to a reduction in contrast at the periphery of the screen, whereby resolution of an image to be reconstructed is reduced or reconstructing the image becomes difficult. Such a problem of nonuniform signal intensity cannot be solved by the above expressions (1) to (3).

Figure 10:
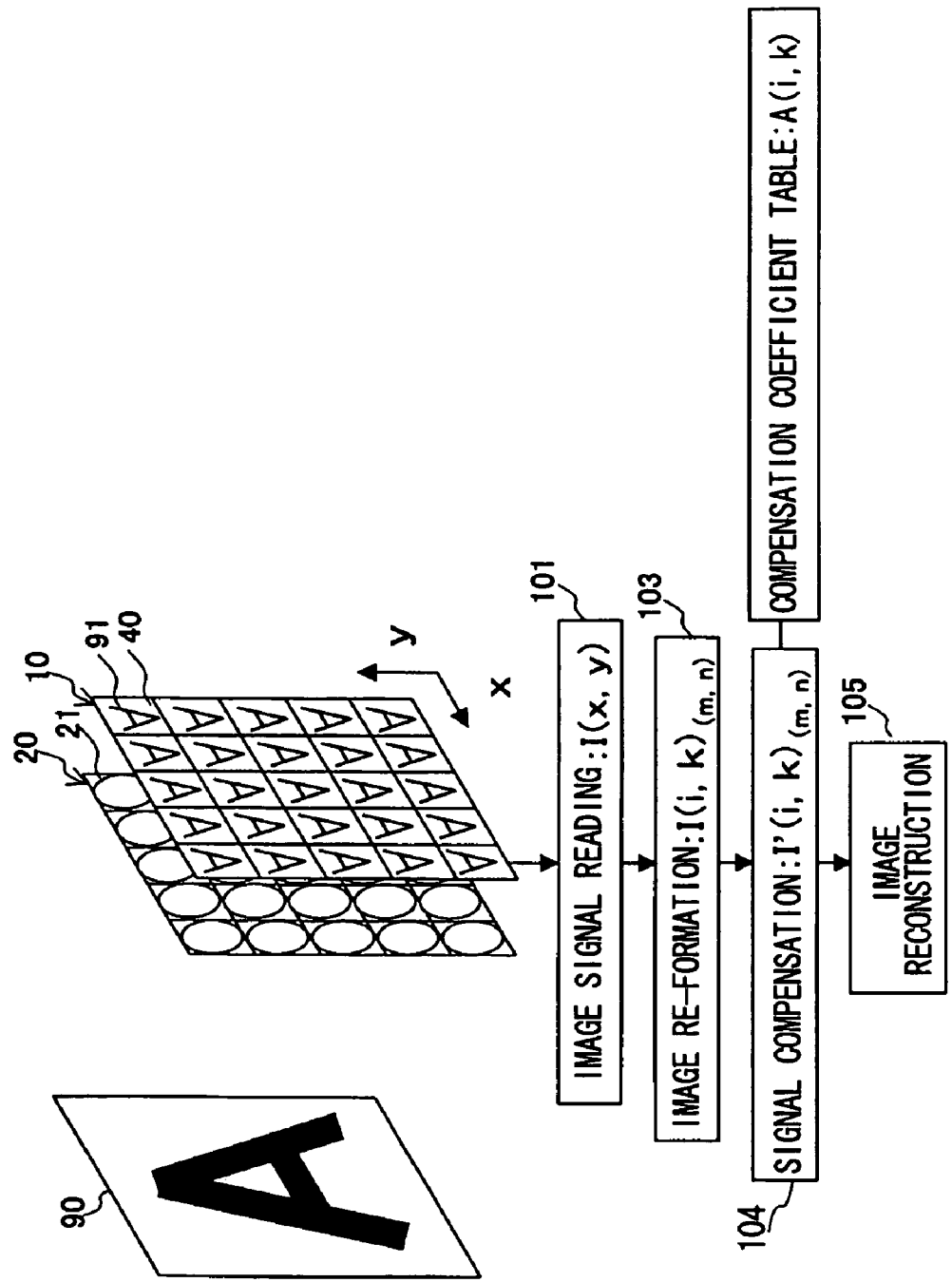
FIG. 10 is a diagram showing a process outline for a signal from a solid-state imaging sensor of an imaging device according to Embodiment 5 of the present invention.

A signal process in the present embodiment is described with reference to FIG. 10. Constituents similar to that of FIG. 4(A) are attached with same reference numerals, and a description therefor is omitted.

As described with reference to FIG. 4(A), signals I(x,y) are read (step 101), and an image is re-formed for each imaging unit 40 (step 103). Thereafter, in the present embodiment, a compensation process is performed for each signal $I(i,k)_{(m,n)}$ for the image in each imaging unit 40.

Previous to the compensation process, a compensation coefficient A(i,k) corresponding to a position $(i,k)_{(m,n)}$ is set in advance for all of the light receiving sections 12 in the imaging unit 40, and stored in a memory. This compensation coefficient table is to reduce variations in quantity of light which enters each of the light receiving sections 12 in the imaging unit 40 when shooting a plain object of uniform brightness. For example, compensation coefficient 1 is assigned to the light receiving section 12 closest to the optical axis 21a of the micro lens 21, and, as the light receiving section 12 becomes farther from the optical axis 21a, a larger compensation coefficient can be assigned thereto progressively. Alternatively, compensation coefficient 1 is assigned to the light receiving section 12 farthest from the optical axis 21a, and, as closer the light receiving section 12 becomes to the optical axis 21a, a compensation coefficient value smaller than one (however, a compensation coefficient is larger than zero) can be assigned thereto progressively.

Then, according to its order, a compensation coefficient A(i,k) in the compensation coefficient table is multiplied by a signal $I(i,k)_{(m,n)}$ corresponding to a position $(i,k)_{(m,n)}$ so as to obtain a compensated $I'(i,k)_{(m,n)}$ (step 104).

Thereafter, an image is reconstructed by using the compensated $I'(i,k)_{(m,n)}$ in a similar manner described with reference to FIG. 4(A) (step 105).

As described above, according to the present embodiment, it is possible to solve a problem that, in each imaging unit 40, an output signal intensity is reduced due to a reduction in quantity of light entering the light receiving section 12 as the light receiving section becomes farther from the optical axis 21a of the micro lens 21. Accordingly, an image with a high quality as far as a periphery thereof can be obtained.

Embodiment 6

Figure 11:
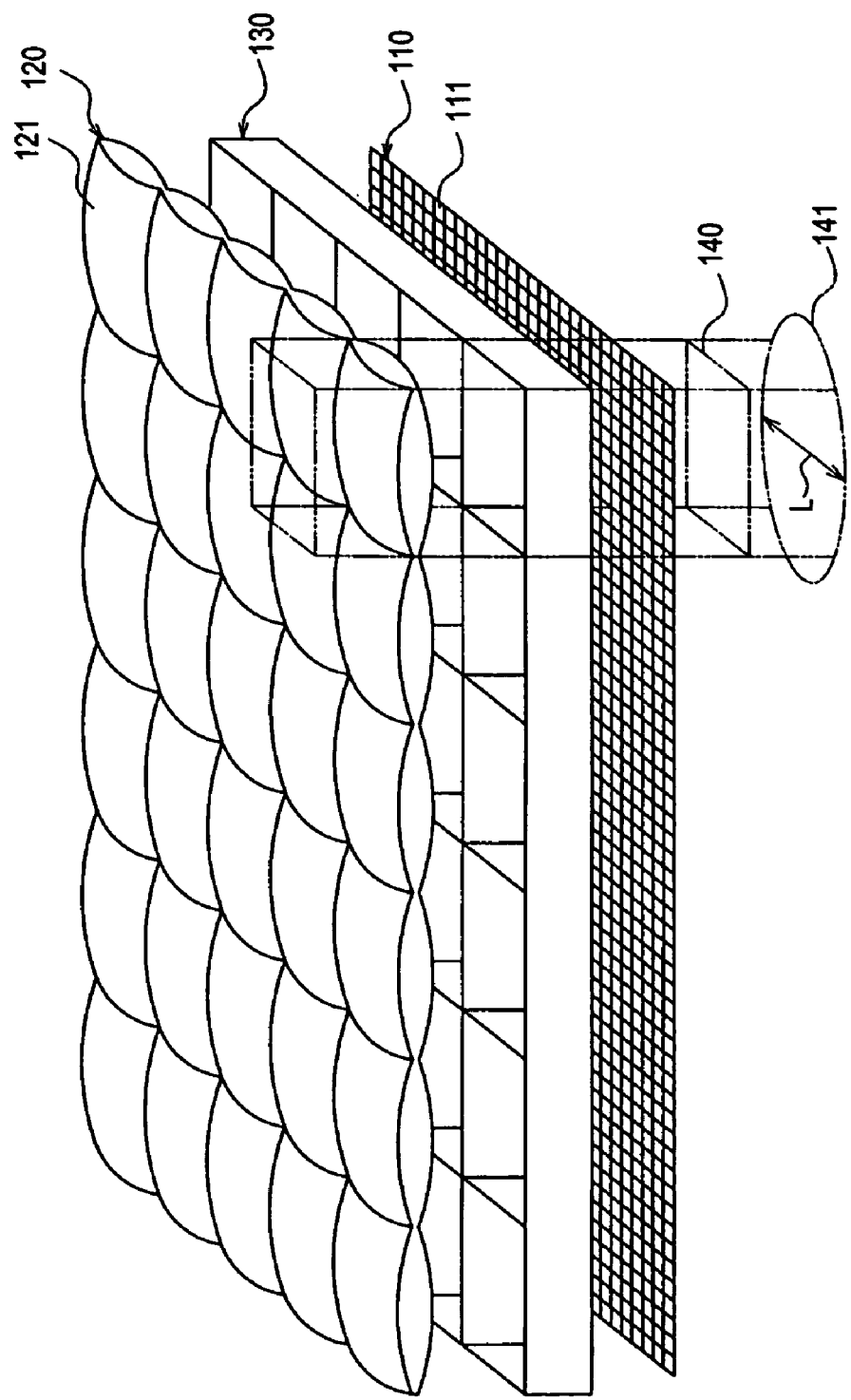
FIG. 11 is a diagrammatic perspective illustration showing a schematic configuration of an imaging device according to Embodiment 6 of the present invention.
Figure 12:
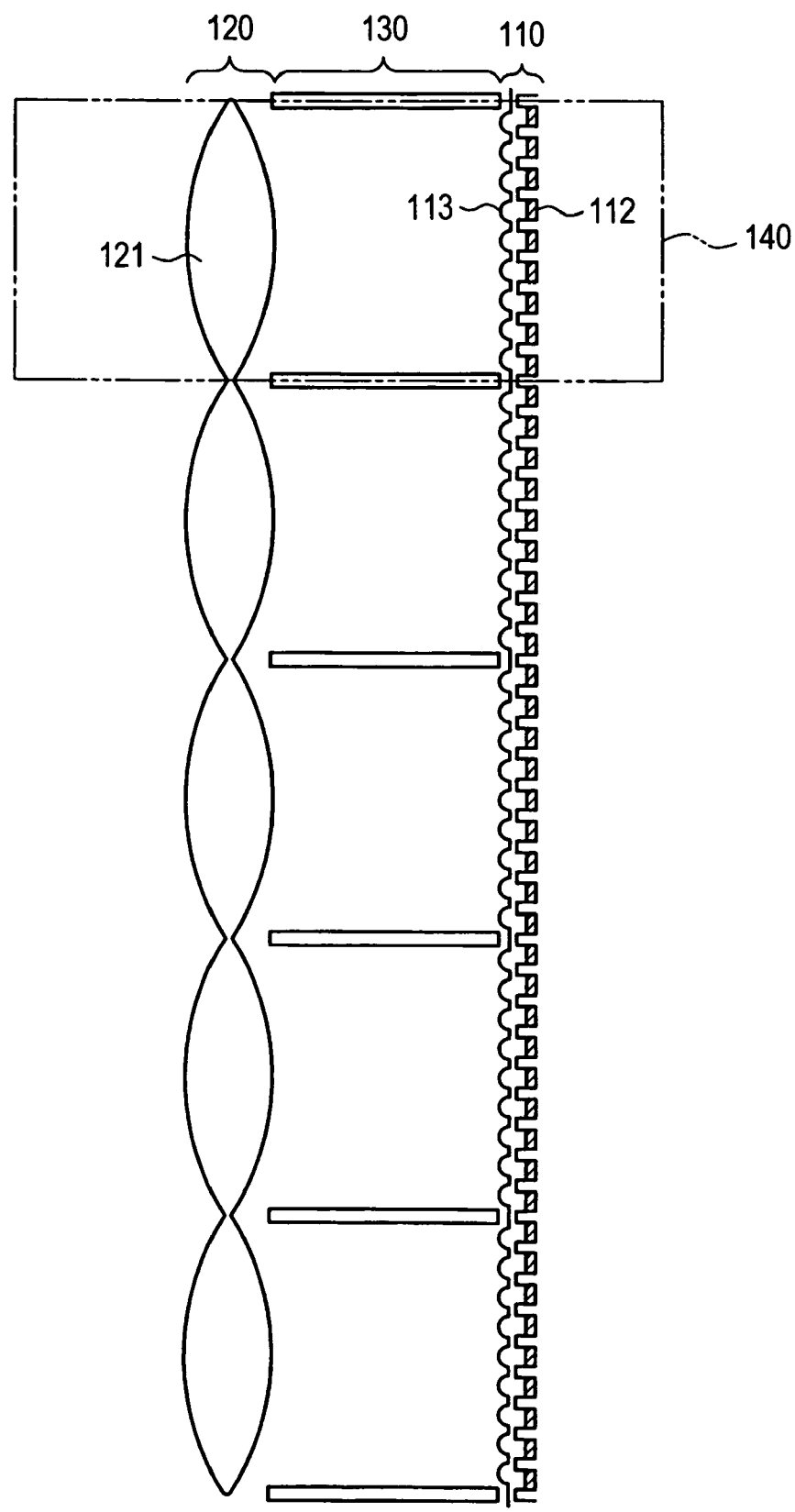
FIG. 12 is a cross sectional illustration showing a section including optical axes of two adjacent micro lenses of the imaging device according to Embodiment 6 of the present invention.

FIG. 11 is a diagrammatic perspective illustration showing a schematic configuration of an imaging device according to Embodiment 6 of the present invention. FIG. 12 is a cross sectional illustration showing a section including optical axes of two adjacent micro lenses of the imaging device according to Embodiment 6 of the present invention.

In FIGS. 11 and 12, the imaging device comprises a solid-state imaging sensor 110 (e.g., a CCD or a CMOS) including a large number of pixels 111 arranged in lateral and longitudinal directions on a first flat surface, and a micro lens array 120 including a plurality of micro lenses 121 arranged in a lateral and longitudinal directions on a second flat surface separately provided so as to be parallel to the first flat surface. One micro lens 121 corresponds to an imaging area of unit including a plurality of the pixels 111. The solid-state imaging sensor 110 includes a photo-electric conversion portion (light receiving section) 112 for performing a photo-electric conversion with respect to each of the pixels 111, and further includes a large number of pixel lenses 113 on a light incidence side of the large number of pixels 111 so arranged that there is one on one correspondence between the pixel lenses 113 and the pixels 111.

A luminous flux from an object enters the plurality of micro lenses 121, and each of the micro lenses 121 forms an optical image of the object on the pixels 111 of a corresponding imaging area of unit. In order to prevent crosstalk from being caused by a light from the micro lens 121 entering the pixel 111 not corresponding to the micro lens 121, a baffle layer 130 is arranged in a grid manner so as to correspond to positions of the micro lenses 121.

One imaging unit 140 comprises the micro lens 121, a space divided by the baffle layer 130, the plurality of the pixels 111 corresponding to the micro lens 121, and the plurality of the pixel lenses 113 respectively corresponding to the plurality of pixels. Note that the baffle layer 130 can be omitted if a luminous flux from the micro lens 121 of another imaging unit 140 can be prevented from entering the pixel 111 to an extent that problems are not to be caused.

Figure 13:
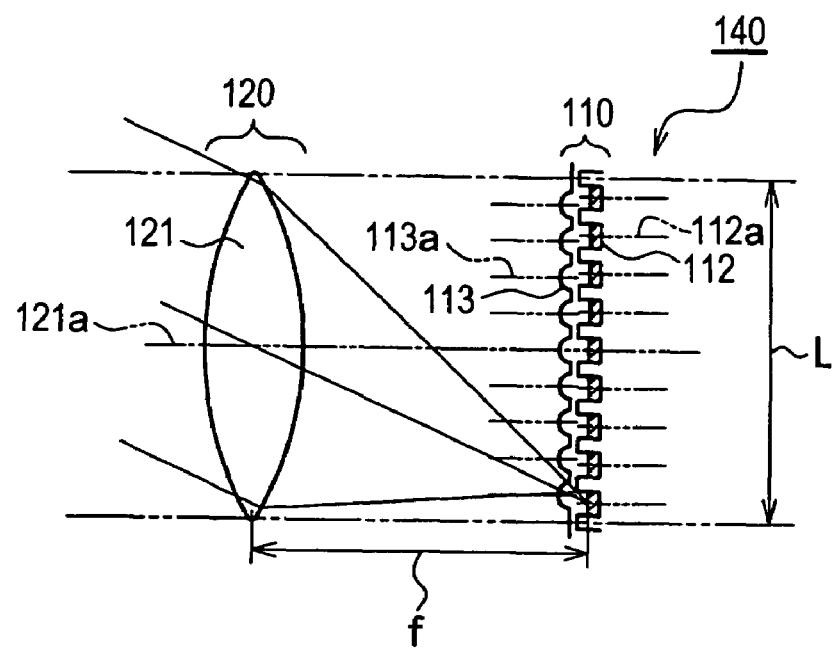
FIG. 13 is an enlarged cross sectional illustration showing an imaging unit of the imaging device according to Embodiment 6 of the present invention.

FIG. 13 is an enlarged cross sectional illustration showing the imaging unit 140 included in the cross sectional illustration of the imaging device shown in FIG. 12. The baffle layer 130 is not shown in FIG. 13.

In the solid-state imaging sensor 110 exemplified by a CCD, a CMOS, or the like, the light receiving section (photo-electric conversion portion) 112 which is arranged on each pixel 111 for performing a photo-electric conversion is generally positioned not on a surface of the solid-state imaging sensor 110 but on a bottom part of a depressed portion thereof, as shown in FIGS. 12 and 13. Accordingly, an angle of an incident light which can enter the light receiving section 112 has an upper limit. As FIG. 13 clearly illustrates, the angle of the incident light from the micro lens 121 becomes large as a position of the light receiving section 112 becomes farther from an optical axis 121$a$ of the micro lens 121.

The pixel lens 113 is also referred to as an "on chip lens", and leads a luminous flux which is to form an image on a place other than the light receiving section 112 to the light receiving section 112. The pixel lenses 113 are arranged with a substantially equal pitch, and the pitch is smaller than a pitch in arranging the light receiving sections 112. As FIG. 13 shows, there is a substantial match between a center line (a straight line passing through the center of the light receiving section 112 and being perpendicular to the first flat surface) 112$a$ of the light receiving section 112 positioned on the optical axis 121$a$ of the micro lens 121 or in the vicinity thereof and an optical axis 113$a$ of the pixel lens 113 corresponding to the light receiving section 112.

In other words, the center line 112$a$ of the light receiving section 112 and the optical axis 113$a$ of the pixel lens 113 corresponding to the light receiving section substantially match with the optical axis 121$a$ of the micro lens 121. Optical axes 113$a$ of other pixel lenses 113 excluding the pixel lens 113 are displaced, from the centerline 112$a$ of the corresponding light receiving section 112, in a direction toward the optical axis 121$a$ within the first flat surface. The amount of displacement of the optical axis 113$a$ with respect to the center line 112$a$ becomes large as the distance from the optical axis 121$a$ increases. When viewed from a direction parallel to the optical axis 121$a$, an effective diameter of the pixel lens 113 is larger than a light reception area of the corresponding light receiving section 112.

Through providing the pixel lens 113 having an effective diameter larger than the light receiving section 112 to a light incidence side of the light receiving section 112, and further, through displacing, from the center line 112$a$ of the light receiving section 112 of the corresponding pixel 111, the optical axis 113$a$ of the pixel lens 113 in a direction toward the optical axis 121$a$ of the corresponding micro lens 121, an efficiency in collecting light can be improved, loss in quantity of light can be reduced, and receiving sensitivity can be enhanced. Also, a stray light which occurs due to reflection from a part other than the light receiving section 112 is reduced in amount, whereby an image quality degradation due thereto can be reduced.

In the above embodiment, the pixel lenses 113 are arranged with an equal pitch. However, the present invention is not limited thereto and the pitch in arranging the pixel lenses 113 may differ therebetween.

Also, in the above embodiment, there is a substantial match among the optical axis 121$a$ of the micro lens 121, the center line 112$a$ of the light receiving section 112, and the optical axis 113$a$ of the pixel lens 113 corresponding to the light receiving section 112, but the present invention is not limited thereto. In other words, the center line 112$a$ of any of the light receiving sections 112 does not necessary match with the optical axis 121$a$ of the micro lens 121, and the optical axis 113$a$ of the pixel lens 113 may be displaced from the center line 112$a$ of the corresponding light receiving section 112 for all pixels.

Figure 14:
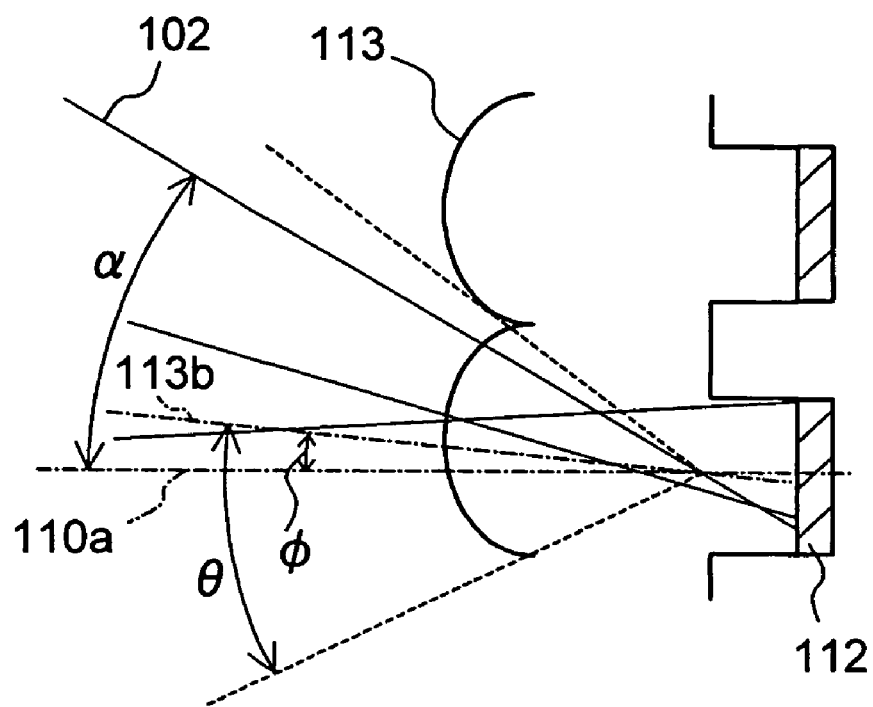
FIG. 14 is an enlarged cross sectional illustration showing a vicinity of a light receiving section of the imaging device according to Embodiment 6 of the present invention.

FIG. 14 is an enlarged cross sectional illustration showing a vicinity of the light receiving section 112. In FIG. 14, a normal line 110$a$ is defined with respect to the first flat surface where the light receiving sections 112 are arranged. $\theta$ is a maximum angle of an incident light which can enter the light receiving section 112. $\alpha$ is an angle of incidence for a light 102 from the micro lens 121 with respect to the light receiving section 112. Because the pixel lens 113 is displaced with respect to the light receiving section 112, as long as a light has an angle equal to or less than an angle $\theta$ with respect to a straight line 113$b$ connecting an apex on a light incidence side of the pixel lens 113 and the center of the light receiving section 112 corresponding to the pixel lens 113, the light can enter the light receiving section 112. $\phi$ is an angle formed between the straight line 113$b$ and the normal line 110$a$ of the first flat surface where the light receiving sections 112 are arranged. In order for the light 102 from the micro lens 121 to enter the light receiving section 112, it is necessary to be $\alpha - \phi \leq \theta$.

Here, when a numerical aperture of the pixel lens 113 is NA, the maximum angle of incidence $\theta$ depends on the NA, and substantially, $\theta = \arcsin NA$ is followed. As shown in FIG. 13, when a focal length of the micro lens 121 is f and a diameter of a circle 141 (see FIG. 1) circumscribing an area (i.e., an image projection area, within the solid-state imaging sensor 110, along the optical axis 121a of the imaging unit 140) where a plurality of the pixels 111 corresponding to one micro lens 121 are positioned is L, an angle of incidence is α=arctan(L/f) at a pixel (light receiving section 112) farthest from the optical axis 121a. Therefore, the following expression (3) described in the above needs to be satisfied:

$$\arctan(L/f) - \phi \leq \arcsin NA \qquad (3).$$

In the present embodiment, values for L, f, φ, and NA are set such that the above expression (3) is satisfied for the light receiving section 112 of the pixel 111 farthest from the optical axis 121a. When the above expression (3) is satisfied for the light receiving section 112 of the pixel 111 farthest from the optical axis 121a, a luminous flux from the micro lens 121 enters all of the corresponding light receiving sections 112 without being shaded by a structure of the solid-state imaging sensor 110. More accurately, when the above expression (3) is satisfied, a luminous flux enters the light receiving section 112 without loss if there is no aberration for the luminous flux from the micro lens 121, and even if there is an aberration included therein, loss in the luminous flux can be minimized.

Note that, in the above description, the optical axis 121a passes through approximately a center of the above circumscribing circle 141, and a diameter L of the circumscribed circle 141 usually equals to a diameter of a circle circumscribing an effective diameter of the micro lens 121. Also, in the present embodiment, a shape of the imaging unit 140 viewed along the optical axis 121a is substantially square, whereby the diameter L equals to a length of a diagonal line of the square. However, the shape of the imaging unit 140 viewed along the optical axis 121a does not need to be substantially square, and may be rectangle. Even with a rectangle, the diameter L equals to a length of a diagonal line thereof.

Figure 15:
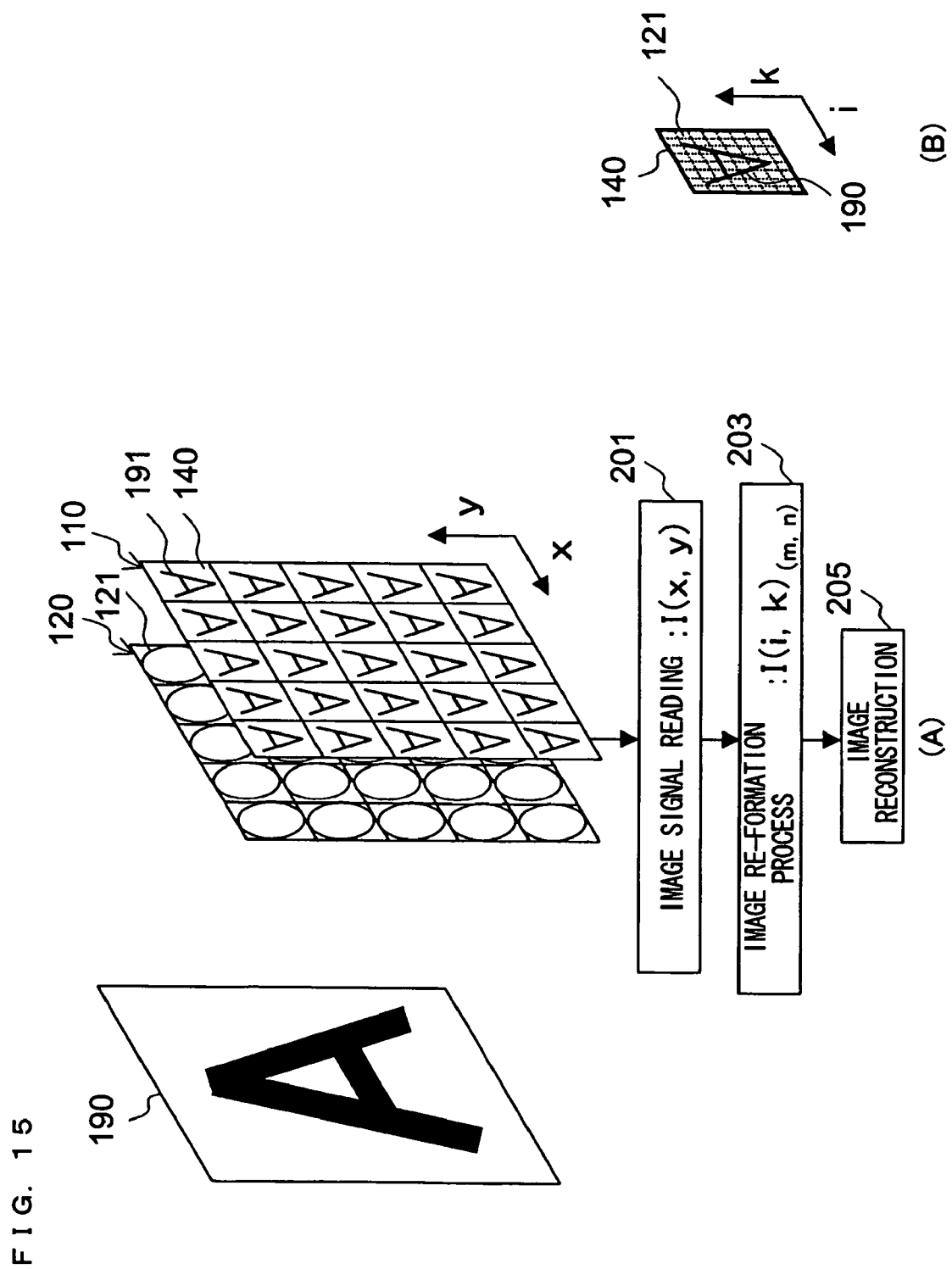
FIG. 15(A) is a diagram showing a process outline for a signal from a solid-state imaging sensor of the imaging device according to Embodiment 6 of the present invention.
FIG. 15(B) is a diagrammatic perspective illustration showing the light receiving section included in the imaging unit of the imaging device according to Embodiment 6 of the present invention.

Next, a method for obtaining an image from a luminous flux having entered each light receiving section 112 of the solid-state imaging sensor 110 is described with reference to FIGS. 15(A) and 15(B). As FIG. 15(A) shows, in each imaging unit 140, the micro lens 121 of the micro lens array 120 forms an optical image 191 of an object 190 on the solid-state imaging sensor 110. Each light receiving section 112 of the solid-state imaging sensor 110 photo-electric converts the luminous flux having entered. Here, when a vertical axis of the solid-state imaging sensor 110 is an x axis, a horizontal axis thereof is an y axis, and a signal from the light receiving section 112 positioned at (x,y) is I(x,y), signals I(x,y) for all light receiving sections 112 included in the solid-state imaging sensor 110 are read (step 201).

Next, the signals I(x,y) from the light receiving section 112 are divided with respect to each imaging unit 140. That is, as shown in FIG. 15(B), when a position of the light receiving section 112 at an i-th column and k-th row in the imaging unit 140 where the light receiving sections 112 are arranged in m columns×n rows is $(i,k)_{(m,n)}$ and a signal from the light receiving section 112 is $I(i,k)_{(m,n)}$, the above signal I(x,y) is treated as a signal $I(i,k)_{(m,n)}$ in the imaging unit 140. Consequently, an image consisted of pixels arranged in m columns×n rows is re-formed with respect to each imaging unit 140 (step 203).

Thereafter, a piece of image is reconstructed by processing signals $I(i,k)_{(m,n)}$ among different imaging units 140 (step 205). As a signal process therefor, a method disclosed in patent document 2 can be used, and therefore a detailed description therefor is omitted. The signal $I(i,k)_{(m,n)}$ from the light receiving section 112 arranged at a same position (i,k) differs from imaging unit 140 to imaging unit 140 because a position where the object's optical image 191 is formed in the imaging unit 140 differs from imaging unit 140 to imaging unit 140. Accordingly, an image with a high resolution which significantly exceeds the number (m×n) of the light receiving sections 112 included in one imaging unit 140 can be obtained.

According to the present embodiment, in each imaging unit 140, a luminous flux from the micro lens 121 enters all of the light receiving sections 112 without being shaded by a structure of the solid-state imaging sensor 110. Therefore, a sufficient quantity of light enters the light receiving section 112 regardless the position thereof, whereby a high contrast signal I(x,y) can be obtained. Accordingly, a reconstruction of a detail structure of an object can be performed.

In the above signal process, if a signal intensity for a same position of the object 190 differs from imaging unit 140 to imaging unit 140, an image quality degradation such as reduction in contrast or in resolution for an image to be reconstructed is caused. With the imaging device of the present embodiment satisfying the above expression (3), a luminous flux enters all of the light receiving sections 112 included in each imaging unit 140 without shading, whereby it is possible to reduce intensity differences in signals for the same position of the object 190 between imaging units 140. Accordingly, a high quality image can be obtained.

Moreover, a luminous flux can be prevented from being shaded, thereby reducing the amount of reflected luminous flux entering an unintended light receiving section 112. Therefore, an image quality degradation due to a stray light can be prevented.

Note that an imaging device according to each embodiment includes a configuration of the following invention.

(A) An imaging device operable to output an image of an object as an electrical image signal, comprising:

a solid-state imaging sensor including pixels which are two dimensionally arranged on a first flat surface and each of which has a photo-electric conversion function; and a lens array including micro lenses two dimensionally arranged on a second flat surface separately provided so as to be parallel to the first flat surface, wherein the solid-state imaging sensor includes imaging areas of unit including a plurality of the pixels, each of the micro lenses forms an optical image of the object on a corresponding imaging area of unit, each of the pixels has a pixel lens on a light incidence side thereof, and at least one of the pixel lenses is positioned such that an optical axis thereof is displaced in a direction toward an optical axis of a corresponding micro lens with respect to a center of a photo-electric conversion portion of a corresponding pixel.

According to the above imaging device, in each imaging unit, an optical path of a luminous flux which enters a light receiving section from the micro lens can be bent in a direction of the light receiving section by the pixel lens, and therefore, an angle of incidence to the light receiving section can be reduced. Accordingly, light loss can be reduced and an occurrence of a stray light can be suppressed, whereby an image with a high quality as far as a periphery thereof can be obtained.

Also, in (A), the amount of displacement of an optical axis of the pixel lens with respect to the center of the photo-electric conversion portion of the pixel corresponding to the pixel lens becomes large as the distance from an optical axis of the corresponding micro lens becomes increased. Accordingly, even when an angle of an incident luminous flux from the micro lens is large due to a large distance from the optical axis of the micro lens, the optical path of the luminous flux can be bent in a direction of the light receiving section by the pixel lens, whereby the angle of incidence to each light receiving section can be reduced. Therefore, it is possible to solve a problem that, in each imaging unit, an output signal intensity is reduced due to a reduction in quantity of light entering a light receiving section as the light receiving section of a pixel becomes farther from an optical axis of a micro lens. Consequently, an image with a high quality as far as a periphery thereof can be obtained.

Also, in (A), the following expression (3) is satisfied for a pixel, from among the pixels included in the imaging area of unit corresponding to each of the micro lenses, positioned farthest from an optical axis of a corresponding micro lens:

$$\arctan(L/f) - \phi \leq \arcsin NA \qquad (3)$$

where $\theta$ is a maximum angle of an incident light capable of entering a pixel, f is a focal length of a micro lens, L is a diameter of a circle circumscribing an imaging area of unit corresponding to one of the micro lenses, NA is a numerical aperture of a pixel lens, and $\phi$ is an angle formed between a normal line of the first flat surface and a straight line connecting an apex on a light incidence side of a pixel lens and a center of an imaging area of unit.

As such, an angle of an incident luminous flux which enters a light receiving section is appropriately controlled, and thereby preventing the luminous flux from being shaded. Accordingly, light loss can be further reduced, and an occurrence of a stray light can be further suppressed.

INDUSTRIAL APPLICABILITY

An application field for an imaging device of the present invention is not particularly limited, but the imaging device can be made slim and enables to provide an image with a high quality; thus, the imaging device can be particularly applied to a portable device such as a slim and compact type PDA or a mobile telephone terminal, or alternatively, a card with an ID or a credit function, or the like.

The invention claimed is:

1. An imaging device operable to output an image of an object as an electrical image signal, comprising:
    a solid-state imaging sensor including pixels which are two dimensionally arranged on a first flat surface and each of which has a photo-electric conversion function; and
    a lens array including micro lenses two dimensionally arranged on a second flat surface separately provided so as to be parallel to the first flat surface, wherein
    the solid-state imaging sensor includes imaging areas of unit including a plurality of the pixels,
    each of the micro lenses forms an optical image of the object on a corresponding imaging area of unit, and,
    a following expression (1) is satisfied for a pixel, from among the pixels included in the imaging area of unit corresponding to each of the micro lenses, positioned farthest from an optical axis of a corresponding micro lens:

$$\arctan(L/f) \leq \theta \qquad (1),$$

where $\theta$ is a maximum angle of an incident light capable of entering a pixel, f is a focal length of a micro lens, and L is a diameter of a circle circumscribing an imaging area of unit corresponding to one of the micro lenses.

2. The imaging device according to claim 1, wherein each of the pixels has a pixel lens on a light incidence side thereof, and, instead of the aforementioned expression (1), a following expression (2) is satisfied for the pixel, from among the pixels included in the imaging area of unit corresponding to each of the micro lenses, positioned farthest from the optical axis of the corresponding micro lens:
to each of the micro lenses, positioned farthest from the optical axis of the corresponding micro lens:

$$\arctan(L/f) \leq \arcsin NA \qquad (2),$$

where

NA is a numerical aperture of a pixel lens.

3. The imaging device according to claim 1, wherein each of the pixels has a pixel lens on a light incidence side thereof, and at least one of the pixel lenses is positioned such that an optical axis thereof is displaced from a center of a photo-electric conversion portion of a corresponding pixel.

4. The imaging device according to claim 3, wherein, instead of the aforementioned expression (1), a following expression (3) is satisfied for the pixel, from among the pixels included in the imaging area of unit corresponding to each of the micro lenses, positioned farthest from the optical axis of the corresponding micro lens:

$$\arctan(L/f) - \phi \leq \arcsin NA \qquad (3),$$

where

NA is a numerical aperture of a pixel lens, and $\phi$ is an angle formed between a normal line of the first flat surface and a straight line connecting an apex on a light incidence side of a pixel lens and a center of an imaging area of unit.

5. The imaging device according to claim 3, wherein the pixel lens is positioned such that the optical axis thereof is displaced in a direction toward an optical axis of a corresponding micro lens with respect to the center of the photo-electric conversion portion of the corresponding pixel.

6. The imaging device according to claim 3, wherein an amount of displacement of the optical axis of the pixel lens with respect to the center of the photo-electric conversion.

7. The imaging device according to claim 3, wherein an output signal from each of the pixels included in an imaging area of unit is compensated by using a compensation coefficient set in advance according to the distance between an optical axis of a corresponding micro lens and each of the pixels.

8. The imaging device according to claim 1, wherein the solid-state imaging sensor is a CCD.

9. The imaging device according to claim 1, wherein the solid-state imaging sensor is a CMOS.

* * * * *